(12) United States Patent
Takahashi

(10) Patent No.: US 7,982,368 B2
(45) Date of Patent: Jul. 19, 2011

(54) POLYMER ACTUATOR AND DEVICE EQUIPPED WITH POLYMER ACTUATOR

(75) Inventor: Isao Takahashi, Miyagi-Ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 12/973,538

(22) Filed: Dec. 20, 2010

(65) Prior Publication Data

US 2011/0089787 A1 Apr. 21, 2011

Related U.S. Application Data

(63) Continuation of application No. PCT/JP2009/061440, filed on Jun. 24, 2009.

(30) Foreign Application Priority Data

Jul. 2, 2008 (JP) ................. 2008-173034

(51) Int. Cl.
*H01L 41/09* (2006.01)

(52) U.S. Cl. ........ 310/330; 310/311; 310/367; 310/368; 310/800

(58) Field of Classification Search ............ 310/311, 310/330, 367, 368, 800
See application file for complete search history.

(56) References Cited

U.S. PATENT DOCUMENTS

| | | | | |
|---|---|---|---|---|
| 2,900,536 A | * | 8/1959 | Palo | 310/330 |
| 5,814,923 A | * | 9/1998 | Shimada | 310/311 |
| 5,994,821 A | * | 11/1999 | Imada et al. | 310/332 |
| 6,246,155 B1 | * | 6/2001 | Nishihara et al. | 310/328 |
| 6,550,116 B2 | * | 4/2003 | Nishihara et al. | 29/25.35 |
| 7,602,098 B2 | * | 10/2009 | Ide | 310/311 |
| 2005/0104478 A1 | * | 5/2005 | Xu et al. | 310/331 |
| 2005/0146401 A1 | * | 7/2005 | Tilmans et al. | 333/187 |
| 2005/0236935 A1 | * | 10/2005 | Ohmori et al. | 310/328 |
| 2006/0187272 A1 | * | 8/2006 | Torii et al. | 347/68 |
| 2006/0266981 A1 | * | 11/2006 | Asaka et al. | 252/500 |
| 2007/0114116 A1 | * | 5/2007 | Nagai et al. | 200/181 |
| 2009/0251027 A1 | * | 10/2009 | Kudoh | 310/330 |

FOREIGN PATENT DOCUMENTS

| | | |
|---|---|---|
| EP | 1 183 566 | 3/2002 |
| JP | 11-235064 | 8/1999 |
| JP | 2001-33854 A | 2/2001 |
| JP | 2005-176428 A | 7/2005 |
| JP | 2006-129541 A | 5/2006 |
| JP | 2008-22655 | 1/2008 |
| WO | 00/73839 A1 | 12/2000 |

OTHER PUBLICATIONS

International Search Report issued in corresponding PCT Application No. PCT/JP2009/061440; issued Aug. 25, 2009.

* cited by examiner

*Primary Examiner* — Walter Benso
*Assistant Examiner* — Bryan P Gordon
(74) *Attorney, Agent, or Firm* — Brinks Hofer Gilson & Lione

(57) ABSTRACT

Provided is a polymer actuator including: an electrolyte layer; and a pair of electrodes provided on both surfaces of the electrolyte layer in the thickness direction, wherein the polymer actuator is deformed when a voltage is applied across the pair of electrodes, and wherein the polymer actuator includes a support portion and a deformation portion, and the gap between the electrodes in the support portion is larger than the gap between the electrodes in the deformation portion.

6 Claims, 3 Drawing Sheets

US 7,982,368 B2

POLYMER ACTUATOR AND DEVICE EQUIPPED WITH POLYMER ACTUATOR

CLAIM OF PRIORITY

This application is a Continuation of International Application No. PCT/JP2009/061440 filed on Jun. 24, 2009, which claims benefit of Japanese Patent Application No. 2008-173034 filed on Jul. 2, 2008. The entire contents of each application noted above are hereby incorporated by reference.

BACKGROUND OF THE INVENTION

1. Field of the Invention

The present invention relates to an actuator that causes deformation when a voltage is applied across electrodes, and particularly, to a polymer actuator that causes deformation in accordance with ion transfer resulting from an electric field.

2. Description of the Related Art

For some time, an ion conducting actuator has been known as one of polymer actuators, where the ion conducting actuator includes an ion-exchange resin layer and metallic electrode layers formed on surfaces of the ion-exchange resin layer so as to be electrically insulated from each other (for example, refer to Japanese Unexamined Patent Application Publication No. 235064). The polymer actuator functions as an actuator by applying a voltage across the metallic electrode layers so that the ion-exchange resin layer is deformed to be curved.

Further, an actuator using a gel having an ion liquid and a carbon nanotube as an electrode layer has been known (for example, refer to Japanese Unexamined Patent Application Publication No. 2005-176428).

FIG. 6 shows a state where upper and lower surfaces of electrodes 3 and 3 constituting a polymer actuator 1 shown in FIG. 5 are sandwiched by connection portions 4a of base substrates 4 so as to fix and support the end portion of the polymer actuator 1.

However, when a strong pressure is applied to the polymer actuator 1 in the thickness direction by sandwiching the polymer actuator 1 using the base substrates 4, the electrode 3 and the electrolyte layer 2 are crushed so that the gap T1 between the electrodes 3 and 3 becomes small since the polymer actuator 1 is formed of a smooth material. Since the electric field strength of the support portion having a decreased gap becomes higher than that of the displacement portion, the concentration of ion transfer more easily occurs in the support portion. As a result, a problem arises in that the displacement amount or the driving force with the displacement is reduced. Further, the insulation performance may be easily degraded due to a decrease in the gap T1. Accordingly, steady current leakage increases, power consumption increases, and a curved displacement amount and a driving force with the curved displacement decrease, which causes a problem in that the characteristics of the actuator are degraded.

SUMMARY OF THE INVENTION

The invention provides a polymer actuator that enhances the characteristics of an actuator by improving a structure of a support portion.

According to an aspect of the invention, provided is a polymer actuator including: an electrolyte layer; and a pair of electrodes provided on both surfaces of the electrolyte layer in the thickness direction, wherein the polymer actuator is deformed when a voltage is applied across the pair of electrodes, and wherein the polymer actuator includes a support portion and a deformation portion, and the gap between the electrodes in the support portion is larger than the gap between the electrodes in the deformation portion.

Accordingly, in the configuration in which the support portion is interposed and fixed between the connection portions of the base substrates, even when a pressure is applied to the support portion in the thickness direction, it is possible to easily maintain the wide gap between the electrodes in the support portion, and to suppress needless concentration of ion transfer or an increase in the current leakage in the support portion compared with the related art. Thus, it is possible to enhance the characteristics of the actuator by further increasing the displacement amount or the driving force with the displacement and reducing power consumption compared with the related art.

In the polymer actuator, the thickness of the electrolyte layer in the support portion may be thicker than the electrolyte layer in the deformation portion. Accordingly, it is possible to enhance the characteristics of the actuator by further effectively suppressing a decrease in the gap between the electrodes with a simple configuration even when a strong pressure is applied in the thickness direction.

In the polymer actuator, the thickness of the electrode in the support portion may be thicker than the thickness of the electrode in the deformation portion. Accordingly, even when a strong pressure is applied in the thickness direction, the electrolyte layer of the support portion may scarcely be crushed since the receiving force of the electrode in the support portion increases. Accordingly, it is possible to further appropriately enhance the characteristics of the actuator by further effectively suppressing concentration of needless ion transfer to the support portion or a decrease in the gap between the electrodes compared with the related art.

According to another aspect of the invention, provided is a device including the polymer actuator, wherein when the support portion of the polymer actuator is supported by a conductive fixation member, the polymer actuator is fixed, and a current is supplied to the electrode. Accordingly, the support portion may be supported by applying a pressure thereto so that the thickness of the support portion becomes thinner than the thickness of the unfixed support portion.

In the device, when a pressure is applied to the support portion in the thickness direction so that the electrolyte layer and the electrode are slightly crushed in the thickness direction, the gap between the electrodes in the support portion may be maintained to be large compared with the related art. Accordingly, it is possible to appropriately enhance the characteristics of the actuator with a simple configuration compared with the related art.

According to the polymer actuator, even when a pressure applied to the support portion in the thickness direction upon interposing and fixing the support portion between the connection portions of the base substrates, it is possible to easily maintain the wide gap between the electrodes in the support portion and to suppress concentration of needless ion transfer to the support portion or an increase in the current leakage compared with the related art. Thus, it is possible to enhance the characteristics of the actuator by increasing the displacement amount or the driving force with the displacement and reducing power consumption more so than in the related art.

DESCRIPTION OF THE PREFERRED EMBODIMENTS

Figure 1:
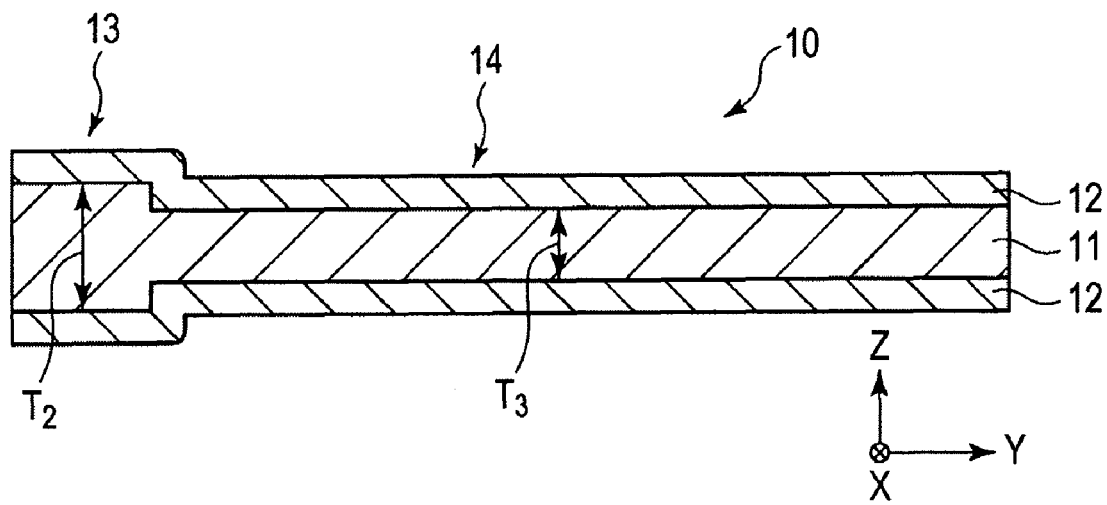
FIG. 1 is a cross-sectional view of a polymer actuator of the embodiment in the thickness direction thereof.
Figure 2:
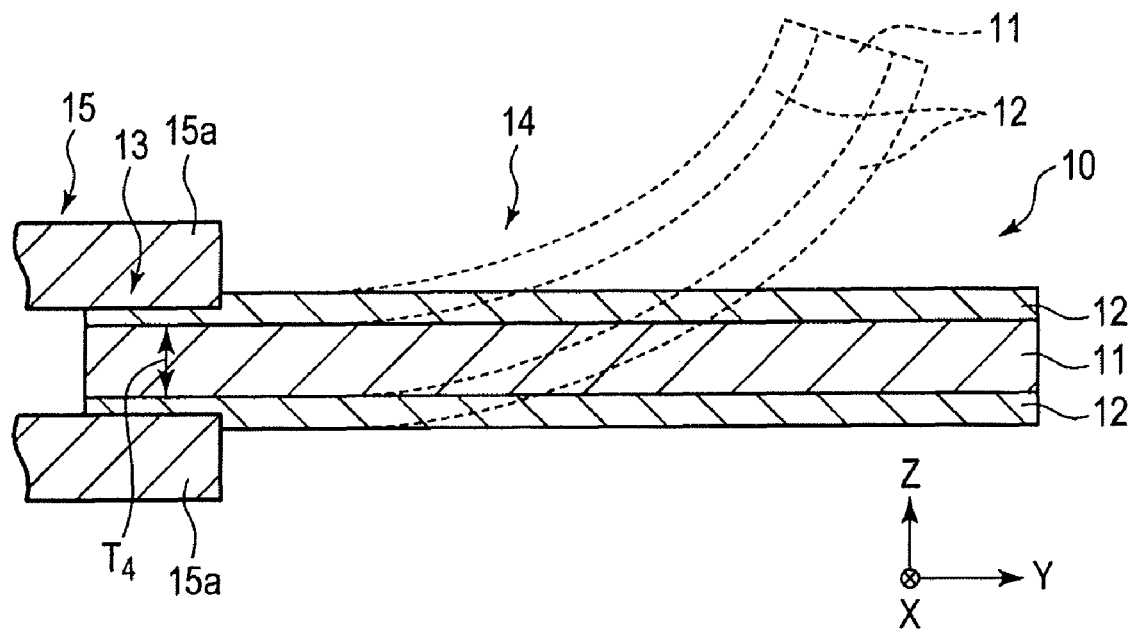
FIG. 2 is a cross-sectional view when a support portion of the polymer actuator shown in FIG. 1 is fixed and supported.
Figure 3:
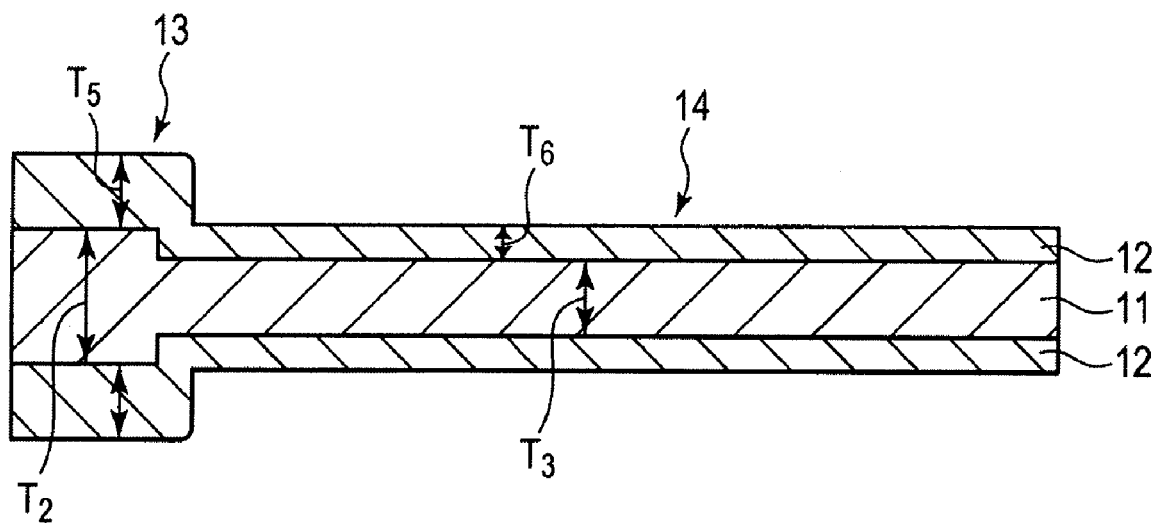
FIG. 3 is a cross-sectional view of the polymer actuator of a modified example of the embodiment.
Figure 4:
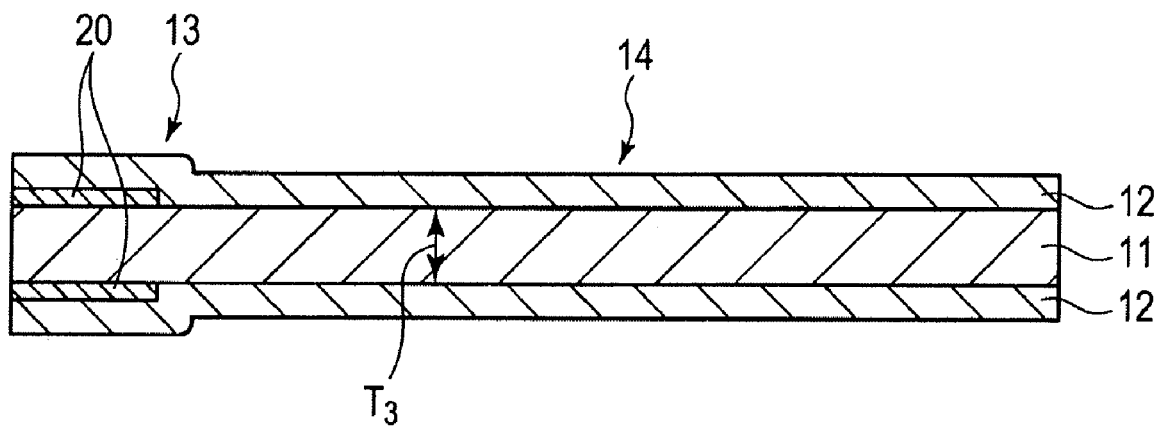
FIG. 4 is a cross-sectional view of the polymer actuator of a modified example of the embodiment.
Figure 5:
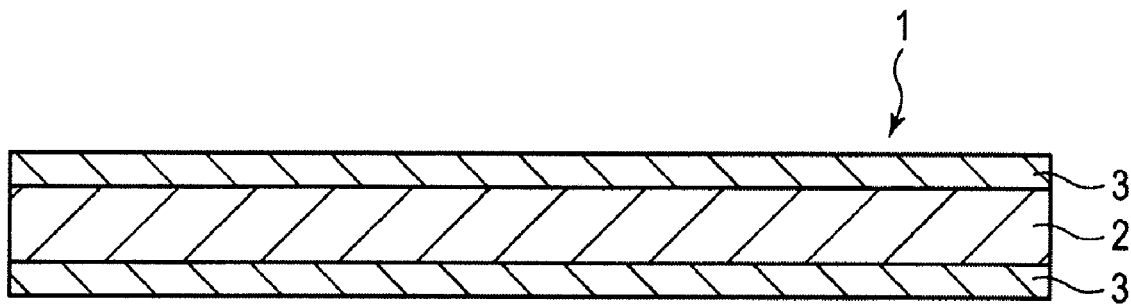
FIG. 5 is a cross-sectional view of the existing polymer actuator in the thickness direction thereof.

FIG. 1 is a cross-sectional view of a polymer actuator of the embodiment in the thickness direction thereof. FIG. 2 is a cross-sectional view when a support portion of the polymer actuator shown in FIG. 1 is fixed and supported. FIGS. 3 and 4 are cross-sectional views of the polymer actuator of modified examples of the embodiment.

A polymer actuator 10 of the embodiment includes: an electrolyte layer 11; and electrodes 12 and 12 which are respectively formed on both surfaces of the electrolyte layer 11 in the thickness direction.

The electrolyte layer 11 contains, for example, an ion-exchange resin and a polarizable organic solvent with salt or a liquid organic compound as an ion liquid. It is desirable that the ion-exchange resin is a cation-exchange resin. Accordingly, an anion is fixed, and a cation is freely movable. It is desirable to use the cation-exchange resin since the curved displacement amount of the polymer actuator 10 is large. Preferred examples of the cation-exchange resin include resins such as polyethylene, polystyrene, and fluorine resin formed by introducing functional groups such as a sulfonic group and a carboxyl group thereto.

The electrodes 12 and 12 are formed in such a manner that an electrode material such as gold or platinum is formed on both surfaces of the electrolyte layer 11 by plating, sputtering, or the like. It is desirable to use electroless plating as the plating.

Alternatively, the electrodes 12 and 12 may be formed in such a manner that a conductive filler is mixed with the same resin constitution as that of the electrolyte layer 11. Examples of the conductive filler may include a carbon nanotube, a carbon nanofiber, and the like. For example, the polymer actuator 10 having a triple layer structure film may be formed in such a manner electrode sheets each having an electrolyte sheet and a conductive filler are laminated.

Further, another detailed example of the polymer actuator 10 includes the electrolyte layer 11 having an ion liquid and a resin material, a conductive filler such as a carbon nanotube, and the electrodes 12 and 12 each having an ion liquid and a resin material. Examples of the resin material include polyvinylidene fluoride (PVDF), polymethylmethacrylate (PMMA), and the like. In this detailed example, since the ion-exchange resin is not contained in the electrolyte layer 11, any cation and anion ion is freely movable.

The material, structure, manufacturing method, and the like of the electrolyte layer 11 and the electrode 12 of the embodiment are not particularly restricted. The types of the electrolyte layer 11 and the electrode 12 are not restricted so long as the polymer actuator includes the electrolyte layer 11 and the electrodes 12 and 12 formed on both surfaces of the electrolyte layer 11 and is displaceable to be curved when a voltage is applied across the pair of electrodes 12 and 12.

When a voltage is applied across the electrodes 12 and 12 constituting the polymer actuator 10, bending stress occurs due to a difference in the expansion between the upper and lower portions of the electrolyte layer 11 in accordance with the ion transfer of ions inside the electrolyte layer 11, so that a deformation portion 14 is curved upward as depicted by, for example, the dotted line of FIG. 2. In the example of FIG. 2, the electrode 12 on the lower side of the electrolyte layer 11 is a cathode, and the electrode 12 on the upper side thereof is an anode. As for the principle that a difference in the expansion occurs between the electrodes in accordance with the transfer of ions, it is generally considered that the principle is not obvious. However, one of known typical principles is that a difference in the expansion occurs due to a difference in the ion radius between a cation and an anion.

Hereinafter, the characteristic configuration of the polymer actuator 10 of the embodiment will be described.

As shown in FIG. 1, in the polymer actuator 10 with a cross-sectional structure having the electrolyte layer 11, and the electrodes 12 and 12 formed on both surfaces of the electrolyte layer 11, the support portion 13 and the deformation portion 14 are integrally formed with each other. The polymer actuator 10 has an elongated square shape of which the dimension in the longitudinal direction (the Y direction) from the support portion 13 to the deformation portion 14 is longer than the dimensions in the transverse direction (the X direction) and the thickness direction (the Z direction).

As shown in FIG. 1, the thickness T2 of the electrolyte layer 11 in the support portion 13 is thicker than the thickness T3 of the electrolyte layer 11 in the deformation portion 14. Accordingly, the gap (=T2) between the electrodes 12 and 12 in the support portion 13 is larger than the gap (=T3) between the electrodes 12 and 12 in the deformation portion 14.

Figure 6:
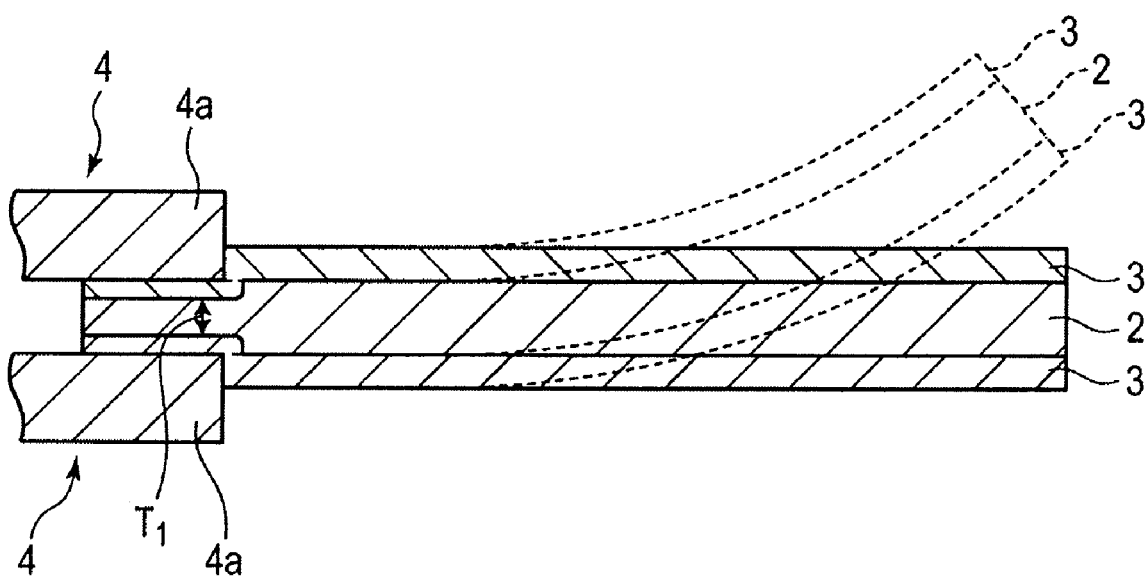
FIG. 6 is a cross-sectional view when a support portion of the polymer actuator shown in FIG. 5 is fixed and supported.

Accordingly, as shown in FIG. 2, the support portion 13 is interposed between connection portions 15a of base substrates 15 from the upper and lower sides provided with the electrodes 12, a pressure is applied to the support portion 13 in the thickness direction (the Z direction), and the electrolyte layer 11 and the electrodes 12 are slightly crushed in the thickness direction, thereby maintaining the gap T4 between the electrodes 12 and 12 in the support portion 13 to be larger than the related art (refer to FIG. 6).

In addition, it is possible to suppress concentration of needless ion transfer in the support portion 13 or an increase in the steady current leakage when a voltage is applied across the electrodes 12 and 12 while the support portion 13 of the polymer actuator 10 is fixed and supported as shown in FIG. 2. As a result, it is possible to reduce power consumption or an increase in the displacement amount or the driving force. As described above, according to the embodiment, it is possible to appropriately enhance the characteristics of the actuator with a simple configuration compared with the related art.

The thickness T2 of the electrolyte layer 11 in the support portion 13 is about from 20 to 30 μm, the thickness T3 of the electrolyte layer 11 in the deformation portion 14 is about from 10 to 20 μm, and the thickness of the electrodes 12 and 12 is about from 30 to 100 μm.

In the electrolyte layer 11 of the embodiment shown in FIG. 3, the thickness T2 in the support portion 13 is thicker than the thickness T3 in the deformation portion 14 as in the electrolyte layer 11 shown in FIG. 1. Further, in FIG. 3, the thickness T5 of the electrode 12 in the support portion 13 is thicker than the thickness T6 of the electrode 12 in the deformation portion 14. Accordingly, when a pressure is applied to the support portion 13 by sandwiching both sides of the support portion 13 provided with the electrodes 12 and 12, the receiving force of the thick electrode 12 increases (the absorbing force of the electrode 12 increases), so that the electrolyte layer 11 in the support portion 13 scarcely crushed. Accordingly, it is possible to more effectively suppress a decrease in the gap between the electrodes 12 and 12, and to enhance the characteristics of the actuator. The thickness T5 of the electrode 12 in the support portion 13 shown in FIG. 3 is about from 40 to 110 μm, and the thickness T6 of the electrode 12 in the deformation portion 14 is about from 30 to 100 μm.

In the embodiment shown in FIG. 4, the thickness T3 of the electrolyte layer 11 is uniform from the support portion 13 to the deformation portion 14. In the embodiment shown in FIG. 4, an insulation gap 20 is provided in each of both surfaces of the electrolyte layer 11 in the support portion 13, and the electrodes 12 and 12 are formed from both surfaces of the gap 20 to both surfaces of the electrolyte layer 11 constituting the deformation portion 14. Since the gap 20 is formed in this way, the gap T2 between the electrodes 12 and 12 in the support portion 13 may be set to be larger than the gap T3 between the electrodes 12 and 12 in the deformation portion 14. Further, the gap 20 may be a space.

The polymer actuator 10 of FIG. 2 has a cantilever structure in which one end of the polymer actuator 10 is fixed and supported, but a structure may be applied in which both ends of the polymer actuator 10 are supported. At this time, the support portions 13 of both ends of the polymer actuator 10 may be formed in several types of FIGS. 1, 3, and 4. Further, the polymer actuator 10 of the embodiment may be effectively used in the application in which a pressure is applied to the support portion 13 in the thickness direction in addition to the application in which the support portion 13 is sandwiched between the base substrates 15 as shown in FIG. 2.

As for the thick thickness T2 of the support portion 13 in the electrolyte layer 11 as shown in FIGS. 1 and 3, the thick thickness may be easily obtained in such a manner that an electrolyte sheet is bent from the end thereof to be folded or a separate electrolyte sheet is added to a portion having a predetermined thickness of the support portion 13 of the electrolyte sheet.

It should be understood by those skilled in the art that various modifications, combinations, sub-combinations and alterations may occur depending on design requirements and other factors insofar as they are within the scope of the appended claims of the equivalents thereof.

What is claimed is:

1. A polymer actuator comprising:
   an electrolyte layer; and
   a pair of electrodes provided on both surfaces of the electrolyte layer in the thickness direction,
   wherein the polymer actuator is deformed when a voltage is applied across the pair of electrodes, and
   wherein the polymer actuator includes a support portion and a deformation portion, and the gap between the electrodes in the support portion is larger than the gap between the electrodes in the deformation portion.

2. The polymer actuator according to claim 1, wherein the thickness of the electrolyte layer in the support portion is thicker than the electrolyte layer in the deformation portion.

3. The polymer actuator according to claim 1, wherein the thickness of the electrode in the support portion is thicker than the thickness of the electrode in the deformation portion.

4. The polymer actuator according to claim 2, wherein the thickness of the electrode in the support portion is thicker than the thickness of the electrode in the deformation portion.

5. A device equipped with a polymer actuator comprising:
   the polymer actuator of claim 1,
   wherein when the support portion of the polymer actuator is supported by a conductive fixation member, the polymer actuator is fixed, and a current is supplied to the electrode.

6. The device according to claim 5, wherein the support portion is supported by applying a pressure thereto so that the thickness of the support portion is thinner than the thickness of the unfixed support portion.

* * * * *